(12) United States Patent
Mehnert et al.

(10) Patent No.: US 7,560,129 B2
(45) Date of Patent: Jul. 14, 2009

(54) MANUFACTURE OF LARGE CHEESE BLOCKS HAVING REDUCED MOISTURE VARIABILITY

(75) Inventors: David Webb Mehnert, Lake Villa, IL (US); Divva Shree Reddy, Lake Zurich, IL (US); Carie Lynn Wolters, Round Lake, IL (US)

(73) Assignee: Kraft Foods Global Brands LLC, Northfield, IL (US)

( * ) Notice: Subject to any disclaimer, the term of this patent is extended or adjusted under 35 U.S.C. 154(b) by 763 days.

(21) Appl. No.: 11/087,981

(22) Filed: Mar. 23, 2005

(65) Prior Publication Data

US 2006/0216373 A1    Sep. 28, 2006

(51) Int. Cl.
    *A23C 19/00*    (2006.01)
(52) U.S. Cl. .................. 426/582; 426/491; 426/512; 426/580
(58) Field of Classification Search .......... 426/310, 426/334, 478, 491, 512, 580, 582
    See application file for complete search history.

(56) References Cited

U.S. PATENT DOCUMENTS

| | | | |
|---|---|---|---|
| 2,766,568 A * | 10/1956 | Tasker | 53/545 |
| 3,404,009 A | 10/1968 | Lambert et al. | |
| 4,049,838 A | 9/1977 | Krueger et al. | |
| 4,869,161 A * | 9/1989 | LaCount | 99/455 |
| 5,520,934 A * | 5/1996 | Meilleur | 426/36 |
| 6,180,153 B1 * | 1/2001 | Palus et al. | 426/517 |
| 6,458,397 B1 * | 10/2002 | Abler | 426/231 |
| 6,701,830 B2 * | 3/2004 | Rose et al. | 99/535 |
| 6,916,500 B2 * | 7/2005 | Abler | 426/582 |

* cited by examiner

*Primary Examiner*—Leslie Wong
(74) *Attorney, Agent, or Firm*—Fitch, Even, Tabin & Flannery

(57) ABSTRACT

The present invention is directed to a process for making a block of cheese having reduced moisture variability. A bulk container having a bottom and sidewalls, and a tube having a fill end and an opposite discharge end, are provided. The discharge end of the tube is positioned at an approximately central axial location of the container. Cheese curd is introduced into the container, and the tube via its fill end. Then, a chilled brine is introduced into the tube via its fill end to mix with curd therein. Preferably, the chilled brine has a salt content which approximately matches the salt content of the moisture phase of the cheese curd. The tube is removed from the cheese curd in the container. The cheese curd is pressed into a curd mass, and then cooled, and thereafter cured, providing a cheese block having reduced moisture variability.

22 Claims, 3 Drawing Sheets

MANUFACTURE OF LARGE CHEESE BLOCKS HAVING REDUCED MOISTURE VARIABILITY

FIELD OF THE INVENTION

The present invention generally relates to cheese manufacture and more particularly it relates to a process for the production of large sized blocks of cheese having reduced moisture variability within the block.

BACKGROUND OF THE INVENTION

Natural cheese of the American type (e.g., cheddar or Colby) is manufactured by coagulating ripened milk of proper acidity with rennet, cutting the coagulant, and cooking the resulting curd, whereupon the curd is pressed and further whey removal is effected. The desired flavor, aroma, and texture of the cheese is obtained by curing which involves holding the cheese for a time at desired temperatures.

The moisture content of hard cheeses is important as it impacts the texture of the product. The fat content of hard cheeses is important as it significantly influences the sensory properties thereof by aiding the production of flavor, aroma, and body in cured cheese. The minimum milk fat and maximum moisture content of most cheeses is regulated by Federal and state regulations. For example, in the United States, hard cheddar cheese should have a minimum milk fat content of 50 percent by weight of the solids, and a maximum moisture content of 39 percent by weight. However, reduced fat and low fat cheeses are desired by many consumers, which typically have lower fat content and higher moisture content than the standard hard cheeses. In order to comply with U.S. Standards of Identity applicable to reduced fat cheddar cheeses, for instance, cheddar cheese may be manufactured to contain approximately 33 percent less fat and up to approximately 20 percent more moisture than standard cheddar cheese.

Natural cheeses, including reduced fat natural cheeses, have been produced in a variety of unit sizes. In cheese production, however, it is desirable to produce large rectangular blocks of cheese which, for example, may weigh approximately 640 pounds. These large blocks of cheese can be conveniently divided into smaller blocks or shredded, and packaged for retail.

In conventional production of such large blocks of cheese, cheese curd is separated from free whey, and then the drained curd is placed in a bulk container for pressing. In the instance of cheese blocks, the container is provided with openings through which the whey drains as the curd is pressed. This procedure is varied somewhat for the manufacture of cheese barrels, in which the cheese curd may be sealed prior to and during pressing.

It is common practice in the manufacture of cheddar and like types of cheese to cool the large pressed blocks of cheese from the manufacturing temperature of about 85-90° F. to a refrigerated temperature of about 32-40° F. Such large blocks of cheese take multiple days to cool from the manufacturing temperature of 85-90° F. to the cold room temperature of about 32-40° F. The cheese is then stored under conditions and for a period of time conducive for curing the cheese.

In the making of large cheese blocks, it is desirable that the moisture content be uniform throughout the block. In prior cheese manufacture, however, a moisture gradient has been observed to occur in the cheese blocks during the cooling period. Moisture has tended to migrate from the core or central region of the cheese blocks towards the exterior surfaces. For instance, over the first several days as cheese cools in bulk containers, moisture is drawn from the warmer interior of the block or barrel to their cooler exterior. For example, single 640 pound blocks of reduced fat cheddar commonly have been observed having an interior moisture of about 44 percent and an external moisture of about 49 percent. The moisture gradient makes it more difficult to form a cheese block having uniform texture throughout. The exterior surface regions of the cheese block may have a firm, smooth texture while the core or central portions of these cheeses may be crumbly or cracked, leading to inferior or waste portions. When the cheese is converted to retail pieces (e.g., 8 oz. chunk or shreds), it is difficult to deal with both the dry center portions and the very moist edges. From a consumer's perspective, cheese from the center often is perceived differently from that at the edge, and the latter variety is preferred by the consumers from an organoleptic standpoint. Moreover, when manufacturing reduced fat cheese or high moisture dry salted cheeses, high moisture target levels may be difficult to achieve without the excessive use of cold wash water. The addition of wash water creates a problem for downstream whey processing and waste water treatment, which is relatively costly.

It has been proposed to rest the cheese blocks at the manufacturing temperature for a period of time before cooling them to permit them to equilibrate. However, in reduced fat (higher moisture) content cheeses in particular, resting the cheese after manufacture and prior to cooling, may lead to increased microbial loads in the finished food product.

It also has been known to accomplish the draining and the pressing of the curd with round probes inserted in the curd to assist in the draining of the whey. However, after removal of these round probes, soft white spots have been left in the curd mass where the curd did not fuse satisfactorily, and moisture variations from point to point within the block have been greater than desired. Various treatments of the curd blocks prior to and during curing have not overcome the problem. It has also been known to use a generally V-shaped perforated pressure plate in connection with the pressing of the curd, as shown in U.S. Pat. No. 3,404,009. However, this pressure plate was primarily designed to remove air and is not adapted for the manufacture of large blocks of cheese. Blocks of cheese also have been rotated during curing in an effort to reduce the occurrence of moisture gradients. Such block rotation procedures are labor intensive and add to the manufacturing costs.

There remains a need for new approaches that will provide an improved process for manufacturing large blocks of cheese, such as reduced fat higher moisture cheeses, with more uniform distribution of moisture and texture throughout the cheese block and which reduce the use of excess water. The present invention provides such processes.

SUMMARY OF THE INVENTION

The present invention is directed to a process for making a large block of cheese having reduced moisture variability through its thickness. For purposes of this invention, a "large block" of cheese is intended to include three dimensional blocks or other shapes having minimum weight of at least about 500 pounds. It has now been found that it is possible to reduce moisture variability throughout such large blocks by effectively and rapidly cooling a middle or central portion of the cheese block prior to cooling the entire block. A number of methods can be used to provide this initial cooling effect. Such methods can include, for example, introducing chilled brine solution, precooled curd material, or mechanical cooling device (e.g., a tube or plate having circulating coolant) into the middle or central portion of the block. Generally, the central portion of the cheese block is cooled to about 10 to about 45° F., and preferably to about 20 to about 45° F., below the initial temperature of the cheese block (typically about 80 to about 90° F. but can be as low as about 60° F.) prior to the cooling of the cheese block. Generally the initial cooling is carried out immediately before the cheese block is placed in the cooling room.

Although other methods can be used to provide the initial cooling effect, the present invention will be described using the chilled brine solution method. The other methods can easily be employed using the guidance, appropriately modified, provided using the chilled brine solution method.

In one embodiment, a form or bulk container having a bottom and sidewalls, and a tube having a fill end and an opposite discharge end, are provided. The tube is vertically positioned at an approximately central axial location of the container such that the discharge end of tube is at or near the bottom of the container. Cheese curd is introduced into the container, and the tube via its fill end. Then, chilled brine is introduced into the tube via its fill end to mix with curd therein. The tube is removed from the cheese curd in the container. The cheese curd is pressed into a curd mass, and then cooled, and thereafter cured, providing a cheese block having reduced moisture variability.

In one embodiment, the cheese curd is pressed into a cheese mass having a diameter of about 24 to about 30 inches, which upon cooling, has significantly reduced moisture variability between a location at a geometric center and a side edge portion thereof. The absolute value of this reduced moisture variability will depend, at least in part, on the initial temperature of the cheese curd into which the chilled brine is introduced. Generally, the lower the initial temperature of the cheese curd, the lower the absolute value of the reduced moisture variability. For example, if the cheese curd has an initial temperature of about 60° F., the moisture content is expected to vary by about 1 percent or less (and preferably less than about 0.5 percent) from a location at a geometric center and a side edge portion. If the cheese curd has an initial temperature of about 90° F., the moisture content is expected to vary by about 2 percent or less (and preferably less than about 1.25 percent) from a location at a geometric center and a side edge portion. Regardless of the initial temperature of the cheese curd, cheese block products made by the process of this invention have reduced moisture variability as well as improved uniformity in texture and/or other sensory properties between the central and side portions of the cheese block products as compared to similar cheese block products made by conventional processes. The relative improvement in moisture variability is at least about 50 percent, preferably at least about 75 percent, and most preferably at least about 90 percent.

This process is especially useful in the production of hard cheeses, such as cheddar and Colby cheeses. The process can be used to provide low moisture variability in cheese blocks of a wide variety of shapes, including cheese blocks having substantially symmetrical cross-sectional shapes, such as square, rectangular, triangular, circular, and the like as well as irregular cross-sectional shapes. The form or container may have a cross-sectional geometry corresponding to that of the desired cheese product.

This process is also applicable to the manufacture of reduced fat, high moisture content varieties of these and other hard cheeses. This process extends the capability of cheese manufacturing systems to produce bulk cheese at higher total moisture with less strain on downstream whey and waste water processing, thereby providing cost savings.

In one preferred embodiment, the tube is positioned in the container with its discharge end resting on the bottom of the container or in close proximity thereto (i.e., generally with the discharge end within about 8 inches and preferably within about 2 inches of the bottom). Preferably, the discharge end of the tube rest on the bottom of the container. After filling with the chilled brine solution, the tube preferably is removed from the cheese curd by raising the tube, approximately vertically, out of the container, in order to help ensure that the brine solution is introduced in the central axial region of the cheese curd mass. Preferably, the chilled brine has a salt content which approximately matches the salt content of the moisture phase of the cheese curd.

Generally the cross sectional area of the tube is about 2.5 to about 25 percent and more preferably about 5 to about 20 percent of the total cross sectional area of the block. The tube may comprise a cross-sectional diameter of about 7 inches to about 9 inches. The tube may comprise a unitary self-supporting hollow member comprised of a wall material selected from the group consisting of polymer, metal, ceramic, and wood. Although the tube preferably has a circular cross section, tubes have other cross sections (e.g., square, rectangular, oval, and the like) can be used. More than one tube can be used so long as the cooling of the central portions is effective. The brine solution preferably is introduced into the tube positioned within the container as a salt solution at about 25 to about 30° F. having a salt content which is approximately the same as the salt content in the moisture phase of the cheese curd. In one particular embodiment, the cheese curd has a salt content of about 4 to about 6 percent into which the brine solution is introduced as about 4 to about 6 percent salt solution at about 25 to about 30° F., and more particularly as about 4.5 to about 5.5 percent salt solution at about 25 to about 27° F. In one preferred embodiment, the brine solution is introduced into the tube at a rate of about 10 to about 25 pounds of the 4-6 percent brine solution per 640 pounds of cheese curd, and more preferably about 12 to about 15 pounds of the 4-6 percent brine solution per 640 pounds of cheese curd. Comparable rates for other sized cheese blocks can be used.

Features, dimensions, and sizes depicted in the figures are illustrative only, and are not necessarily to scale.

DETAILED DESCRIPTION

Figure 1:
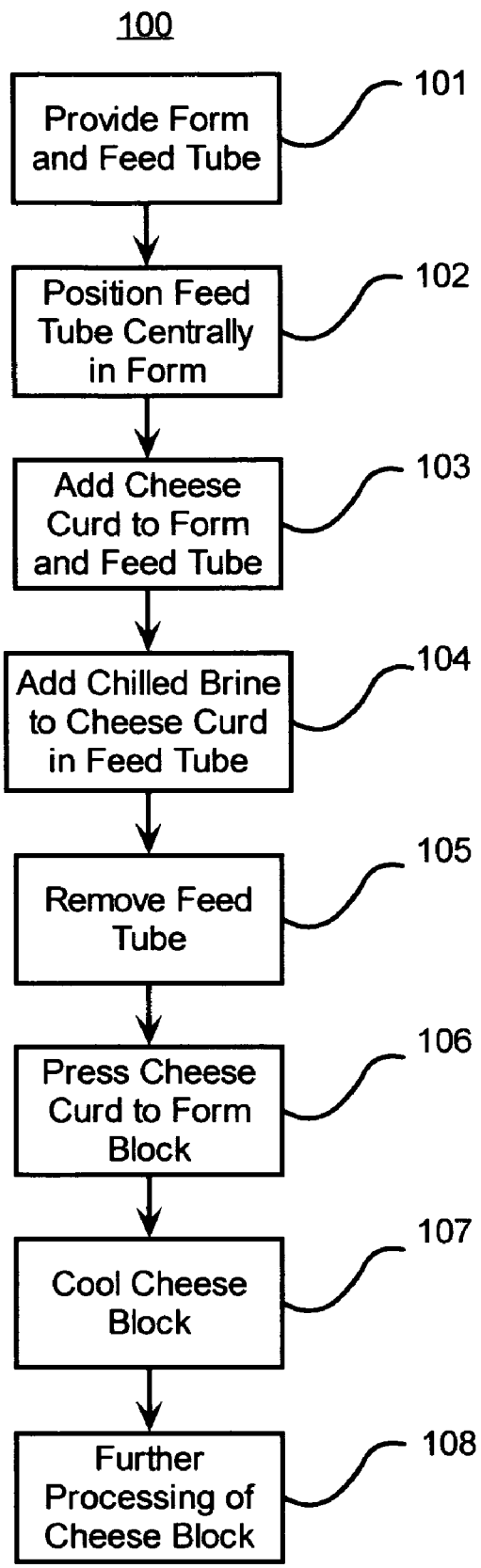
FIG. 1 is a flow chart describing a process for making cheese having reduced moisture variability through its thickness according to an embodiment of this invention.

Referring to FIG. 1, a process 100 is shown for making a block of cheese having reduced moisture variability through its thickness in accordance with an embodiment of the invention. In step 101, a form or bulk container having a bottom and sidewalls, and a tube having a fill end and an opposite discharge end, are provided. In step 102, the discharge end of the tube is positioned at an approximately central axial location of the container. In step 103, cheese curd is introduced into the container, and the tube via its fill end. In step 104, a chilled brine is introduced into the tube via its fill end to mix with curd therein. In step 105, the tube is removed from the cheese curd in the container. In step 106, the cheese curd is pressed into a curd block. In step 107, the cheese block is then cooled, providing a cheese block having reduced moisture variability. Thereafter, in step 108, it is further processed in a conventional manner. For example, it may be cured, providing a cheese block having reduced moisture variability. The cooled cheese block may be packaged prior or after curing, and then, after curing, the block may be cut into smaller blocks or pieces or shredded, and then wrapped for commercial distribution.

Figure 2:
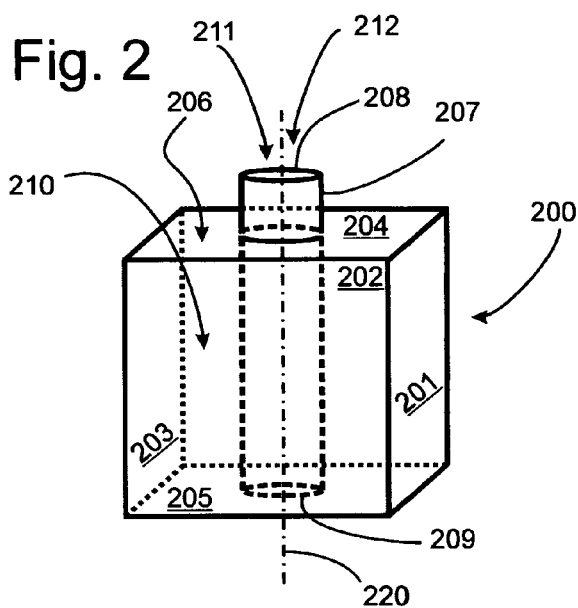
FIG. 2 is a perspective view of an arrangement of a form and a tube used in the process described in FIG. 1 for making a rectangular block shaped cheese product.

Referring to FIG. 2, a form or container 200 for holding and molding cheese curd is shown having sidewalls 201, 202, 203, 204 and a bottom 205 which define a cavity 206. The container 200 is open-ended at the top and includes moisture-sealing inner sidewalls (e.g., metal, plastic, or wood). The form or container 200 generally has a three-dimensional internal geometry corresponding to that of the desired cheese product. A feed tube 207 is inserted into the cavity 206. The tube is oriented generally coincident with the central longitudinal axis 220 of the container 200. In this manner, it is spaced a substantially equal distance from each of the sidewalls 201, 202, 203, 204 of the container 200. The tube 207 has a fill end 208 and an opposite discharge end 209 which preferably is positioned to rest (flush) on the bottom 205 of the form 200. The discharge end 209 generally is located at a central axial position of the bottom of the container 205. Cheese curd is introduced into the container cavity 206 as indicated by arrow 210 and inside the tube 207 as indicated by arrow 211 to fill each of the container 200 and tube 207. The tube preferably is filled with curd to the gsame height as the cavity area of the form outside the tube. For example, the curd may be discharged from a cyclone separator through its outlet end into the container and the tube.

Then, a chilled brine solution is introduced into the tube 207 as indicated by arrow 212. The brine solution flows downward through the interstices in the cheese curd inside the tube 207 under gravity flow. Within several minutes (e.g., 1-2 minutes) of introducing the brine solution, the tube 207 is removed from the cheese curd in the container. The tube 207 preferably is removed from the cheese curd by raising the tube, approximately vertically (i.e., approximately parallel to axis 220), out of the container, in order to help ensure that the brine solution is left in the central axial region of the cheese curd mass as the tube is extracted. The tube 207 may be manually or mechanically lifted out of the container 200. If the curd is particularly firm, a mechanical devise may be used to remove the tube from the barrel or block. In an alternative embodiment multiple tubes may be inserted in the central axial region of the container into which cheese curd and/or brine solution my be introduced therein.

The chilled brine solution preferably is introduced into the tube 207 positioned within the container 200 as an aqueous salt (NaCl) solution at about 25 to about 30° F. having a salt content which is approximately the same as the salt content in the moisture phase of the cheese curd. In one particular embodiment, the cheese curd has a salt content of about 4 to about 6 percent into which the brine solution is introduced as about 4 to about 6 percent salt solution at about 25 to about 30° F., and more particularly as about 4.5 to about 5.5 percent salt solution at about 25 to about 27° F. In one preferred embodiment, the brine solution is introduced into the tube at a rate of about 10 to about 25 pounds of the 4-6 percent brine solution per 640 pounds of cheese curd, and more preferably about 12 to about 15 pounds of the 4-6 percent brine solution per 640 pounds of cheese curd.

Generally the cross sectional area of the tube is about 2.5 to about 25 percent and more preferably about 5 to about 20 percent of the total cross sectional area of the block. In the manufacture of rectangular cheese blocks weighing approximately 600-700 pounds, or barrel (annular) shaped cheese blocks weighing approximately 500-600 pounds, the tube 207 generally may comprise a cross-sectional diameter of about 7 to about 9 inches. Or if multiple tubes, the diameters of the individual tubes should supply approximately the same cross-section area as the single tube of about 7 to about 9 inches. The tube 207 may comprise a unitary self-supporting hollow member comprised of a wall material selected from the group consisting of polymer, metal, ceramic, and wood. For instance, the tube may be polyvinylchloride (PVC) or stainless steel construction.

After the brine solution is introduced into tube 207 and the tube is lifted out of the container 200, the cheese curd can then be pressed or vacuum pressed into a block, cooled, cured, subdivided, and packaged in conventional manners. For instance, rectangular blocks of cheese typically are allowed to drain during pressing, and then are plastic wrapped before subsequent processing. Suitable techniques for pressing the cheese blocks include those conventionally known and used (e.g., see U.S. Pat. No. 4,049,838, which is incorporated herein by reference). Barrel or annular shaped blocks of cheese typically are sealed before and during pressing. For cooling, the freshly pressed cheese curd block typically will be cooled from a temperature of about 85 to about 90° F. to temperature of about of about 32 to about 40° F. over a period of about 3 to about 10 days. The cheese may then be stored in a curing chamber under controlled conditions.

Figure 3:
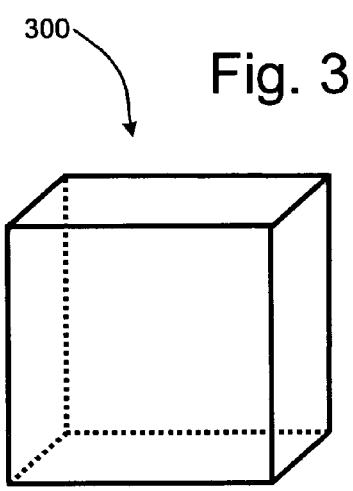
FIG. 3 shows a cheese product made using the equipment illustrated in FIG. 2.

FIG. 3 shows a rectangular cheese block product 300 made using the process described in FIG. 1 with a form as illustrated in FIG. 2. The cheese blocks may be subdivided into smaller blocks or pieces, or shredded. For example, the cheese blocks may be packaged after pressing and before cooling, and then can be rewrapped after any subdividing operation is performed before or after curing.

Figure 4:
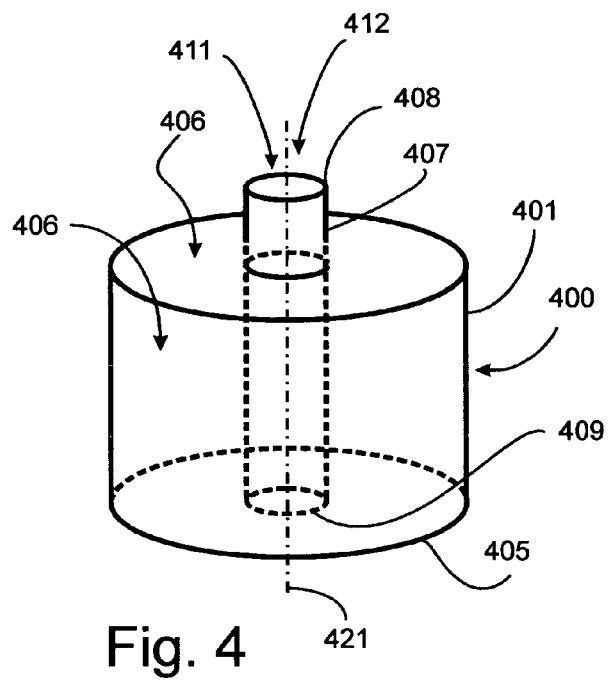
FIG. 4 is a perspective view of an arrangement of a form and a tube used in the process described in FIG. 1 for making a barrel (annular) shaped cheese product.
Figure 5:
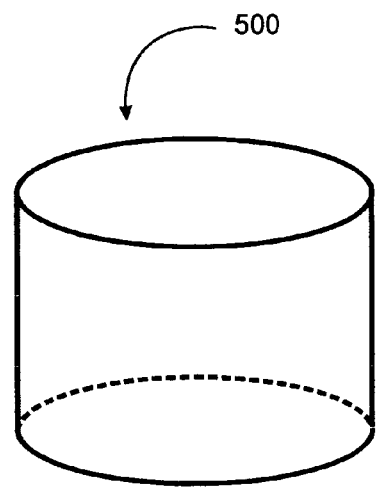
FIG. 5 shows a cheese product made using the equipment illustrated in FIG. 3.

FIG. 4 is a perspective view of an arrangement of a cylindrical form 400 and tube 407 used in the process described in FIG. 1 for making a barrel (annular) shaped cheese product. The form or container 400 for holding and molding cheese curd is shown having sidewalls 401 and a bottom 405 which define a cavity 406. A feed tube 407 is inserted into the cavity 406. The tube is oriented generally coincident with the central longitudinal axis 420 of the container 400. In this manner, it is spaced a substantially equal distance from the sidewall 401 of the container 400. As indicated above, the tube 407 has a fill end 408 and an opposite discharge end 409, the latter of which preferably rests on or near the bottom 405 of the form 400. The discharge end 409 generally is located at a central axial position 421 of the bottom 405 of the container 400. Cheese curd is introduced into the container cavity 406 as indicated by arrow 410 and inside the tube 407 as indicated by arrow 411 to fill each of the container 400 and tube 407. The tube preferably is filled with curd to the same height as the cavity area of the form outside the tube. Then, a chilled brine solution is introduced into the tube 407 as indicated by arrow 412. As indicated above, the brine solution flows downward through the interstices in the cheese curd inside the tube 407 under gravity flow. Within several minutes (e.g., 1-2 minutes) of introducing the brine solution, the tube 407 is removed from the cheese curd in the container. Similar to the prior discussion in regard to FIG. 2, the cheese mass is then pressed, cooled, and cured and otherwise processed in conventional manners. As indicated above, the barrel cheese typically is handled somewhat differently from the rectangular block cheese in that the barrel cheese is vacuum sealed in its plastic liner and fitted with the container top so as to be sealed at its exterior sides during pressing, and thus is not allowed to drain during pressing. FIG. 5 shows a barrel (annular) cheese block product 500 made using the process described in FIG. 1 with a form as illustrated in FIG. 4.

The introduction of the chilled brine into the core of the cheese curd mass before pressing, cooling, and curing has been found to counteract and significantly reduce moisture gradients from arising through the thickness of the cheese block, and especially between the central region and side regions of the cheese block. The absolute value of this reduced moisture variability will depend, at least in part, on the initial temperature of the cheese curd into which the chilled brine is introduced. Generally, the lower the initial temperature of the cheese curd, the lower the absolute value of the reduced moisture variability. For example, if the cheese curd has an initial temperature of about 60° F., the moisture content is expected to vary by about 1 percent or less (and preferably less than about 0.5 percent) from a location at a geometric center and a side edge portion. If the cheese curd has an initial temperature of about 90° F., the moisture content is expected to vary by about 2 percent or less (and preferably less than about 1.25 percent) from a location at a geometric center and a side edge portion. Regardless of the initial temperature of the cheese curd, cheese block products made by the process of this invention have reduced moisture variability as well as improved uniformity in texture and/or other sensory properties between the central and side portions of the cheese block products as compared to similar cheese block products made by conventional processes. The relative improvement in moisture variability is at least about 50 percent, preferably at least about 75 percent, and most preferably at least about 90 percent.

In this manner, cheese block products made by a process of this invention herein have improved uniformity in texture and/or other sensory properties between the central and side portions of the cheese block products. This process is especially useful in the production of hard cheeses, such as cheddar and Colby cheeses. For example, the process may be used in the manufacture of approximately 640 pound cheddar cheese blocks having dimensions of approximately 26×28×32 inches or 22×28×28 inches (side×side×height), or approximately 540 pound barrel (annular) cheddar cheese blocks having dimensions of approximately 26×32 inches (diameter×height). Of course, other sized blocks or barrels or other shapes can be used if desired. The process can be used to provide low moisture variability in cheese blocks of a wide variety of shapes, including cheese blocks having substantially symmetrical cross-sectional shapes, such as square, rectangular, triangular, circular, and the like.

This process is also applicable to the manufacture of reduced fat, high moisture content varieties of these and other hard cheeses. For example, the process is useful to significantly reduce moisture variation between the side and central regions of reduced fat (e.g., minimum 34 percent fat solids), high moisture (e.g., 40-49 percent moisture) cheeses, including cheddar cheese. This process can thus extend the capability of cheese manufacturing systems to produce bulk cheese at higher total moisture with less strain on downstream whey and waste water processing, thereby providing cost savings.

In an alternative, but less preferred, embodiment, cheese curd may be filled into a form or container before the tube is inserted inside the container. The tube is inserted into freshly barreled/blocked cheese already prefilled into the form. In this arrangement, the top lip of the tube preferably is rolled to provide a hand grip and the bottom edge of the tube is sharpened or beveled to facilitate insertion of the tube into the curd. Mechanical pressing of the tube into the prefilled container may be required if the pressed cheese is very firm. Then the brine is introduced as described above.

Although the invention has been described in detail using the chilled brine method to initially the cool the central portion of the cheese block, other methods to provide this initial cooling can be used. Such methods can include, for example, introducing precooled curd material or a mechanical cooling device (e.g., a tube or plate having circulating coolant) into the middle or central portion of the block rather than the chilled brine solution.

The Example that follows is intended to illustrate, and not to limit, the invention. All percentages used herein are by weight, unless otherwise indicated.

EXAMPLE 1

An experimental study was conducted to compare the moisture variability in a cheddar cheese block ("inventive") made with brine core cooling prior to pressing, cooling, and post-processing, in accordance with an embodiment of the present invention, with a control cheese block ("control") made in a conventional manner without the core cooling step.

A block of cheddar cheese (22×28×28 inches (side×side×height)) was manufactured by filling a form having internal dimensions suited to provide the desired product size with salted cheddar curd made in a conventional manner. A stainless steel, thin walled cylinder approximately 8 inch in diameter was positioned in the center of the form with its discharge end touching the axial central region of the bottom of the form. Approximately 640 pounds of cheese curd (67° F.) was then filled into the container and the inside of the tube. The tube was filled with curd to the same height as the cavity area of the form outside the tube. After insertion of the tube, 12.5 pounds of chilled salted water (5.0 percent salt) at a temperature of 26° F. was poured into the center of the tube. Within 1-2 minutes, the tube was lifted vertically upward and out of the form.

Figure 6:
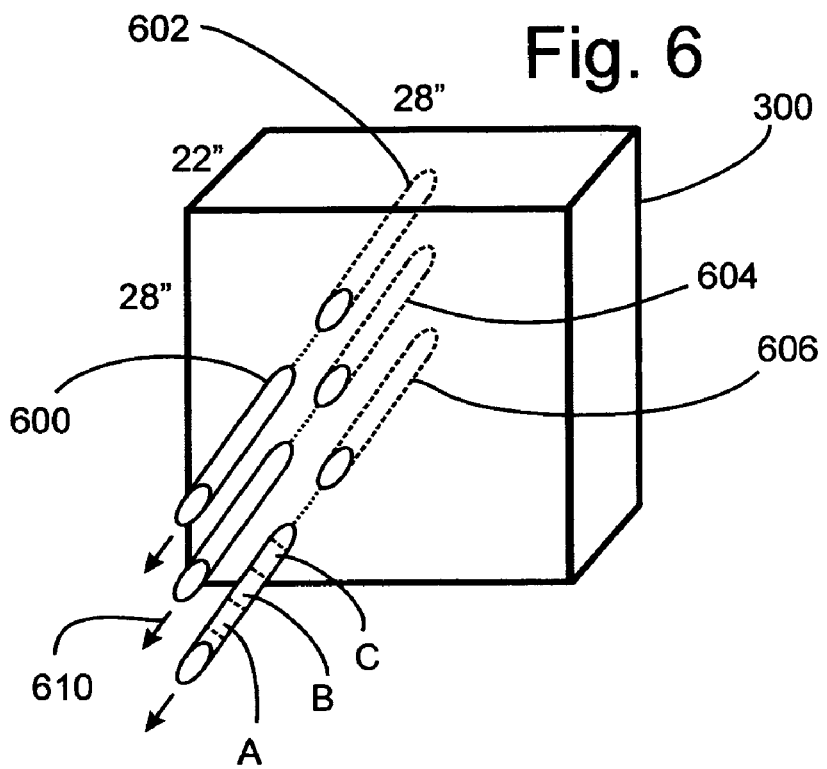
FIG. 6 is an exploded perspective view showing the block sampling plan use to measure moisture variation at different vertical and depth positions of a cheese block made in accordance with an embodiment of the present invention and a control cheese product made in a conventional manner, as described in Example 1 hereinafter.

The cheese was then treated in a normal manner. It was pressed, cooled down to 36° F. over a period of about 72 hours, and then the moisture content was measured at different locations within the mass of the cheese block. A control cheese block was prepared in a similar manner except without the brine core cooling step. After the 72 hour cooling step, the moisture content of each block was measured at different locations within the mass of the cheese block 300 using the sampling scheme shown in FIG. 6, wherein sampling points were at various cross-section depths and vertical height positions within the cheese blocks. As indicated, 11 inch sample plugs 600 were withdrawn from the cheese block in the short side (22 inch) direction of the block at three different vertical heights of the block: 602 (top), 604 (middle), and 606 (bottom) using an appropriate corning device; plugs 600 were removed from the cheese block 300 as indicated by arrow 610. Each cheese plug taken had three designated depth sections, indicated as sections A, B, and C in FIG. 6, which were each about 3.67 inches long, with section A encompassing the exterior side of the block, section C encompassing a central axial part of the block, and section B the intervening middle section. The three different vertical height positions at which samples were extracted were at 29 inches from the bottom, 15 inches from the bottom, and 1 inch from the bottom (locations 602, 604, and 606, respectively).

Table 1 describes moisture content values measured after the cooling step at the various sampling locations for the inventive cheese block representing and present invention and the control cheese block representing the prior art. The averages of the top, middle, and bottom sampling locations for each sampling depth location A, B, and C, as well as the net differences of the averages are indicated in Table 1.

TABLE 1

|  | Moisture (%) | | |
| --- | --- | --- | --- |
|  | A | B | C |
| Inventive | | | |
| Top | 50.27 | 50.27 | 49.95 |
| Middle | 49.58 | 49.23 | 49.28 |
| Bottom | 49.02 | 49.16 | 49.33 |
| Average | 49.62 | 49.55 | 49.52 |
| Average Net Difference | | 0.10 | |
| Control | | | |
| Top | 48.81 | 48.73 | 48.71 |
| Middle | 50.37 | 49.27 | 48.51 |

TABLE 1-continued

|  | Moisture (%) | | |
| --- | --- | --- | --- |
|  | A | B | C |
| Bottom | 50.05 | 50.02 | 48.71 |
| Average | 49.74 | 49.34 | 48.64 |
| Average Net Difference | | 1.10 | |

Figure 7:
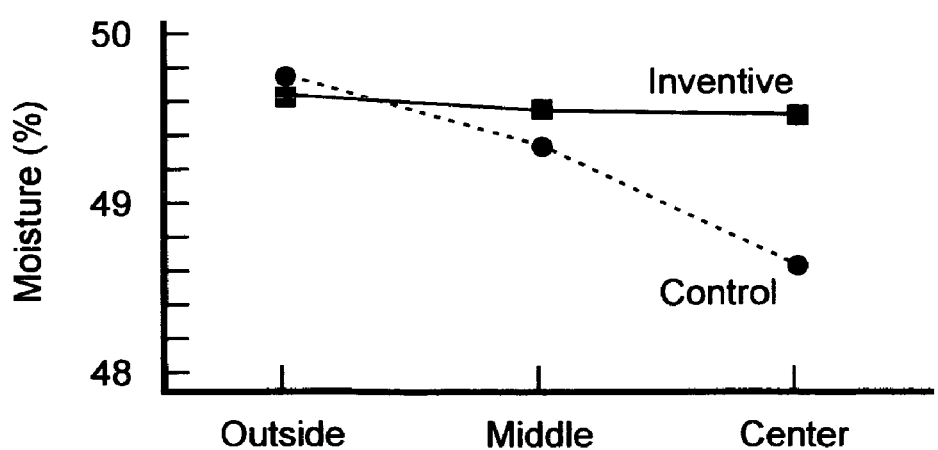
FIG. 7 is a plot showing moisture measurements at the side, middle, and center locations of a cheese block made in accordance with an embodiment of the present invention and a control cheese product made in a conventional manner, as described in Example 1 hereinafter.

FIG. 7 is a plot of the average values of the top, middle, and bottom moisture measurements for the inventive sample and the control sample. As shown by the plot, moisture variation between the center and side of the inventive sample was limited to 0.10 percent, while the control sample had a variation of 1.10 percent.

EXAMPLE 2

A similar cheese block was prepared as in Example 1 except that two 8-inch diameter PVC tubes were used to introduce the chilled brine solution. The initial temperature of the cheese curd used to fill the container was 67° F. The temperatures of the outer and central portions of the cheese cured after introduction of the chilled brine were measured and the following results were obtained.

|  | Temperature (° F.) | |
| --- | --- | --- |
| Time | Outer Portion | Central Portion |
| After Filling Container with Cheese Curd | 67 | 67 |
| After Introduction of Chilled Brine | 67 | 50.5 |
| After Pressing to Form Cheese Block* | 67 | 62 |

*Approximately 10 to 12 minutes after introduction of chilled brine.

The moisture variability of the resulting cured cheese block was similar to that found in Example 1.

EXAMPLE 3

A similar cheese block was prepared as in Example 1 except that (1) the initial temperature of the curd used to fill the container was at 80° F. and (2) the amount of chilled brine added was varied. The conditions and results were as follows:

| | Chilled Brine | | Curd Temp (° F.) | | Moisture† | | Moisture Difference | |
| --- | --- | --- | --- | --- | --- | --- | --- | --- |
| | | | | | | | | Relative |
| | Amount | | | | | At Center* | | Reduction |
| Sample | (lbs) | Temp. (° F.) | At Initial Fill | At Center‡ | At Edge* (%) | (%) | Absolute (%) | (%) |
| Control 1 | 0 | — | 80 | — | 46.12 | 43.25 | 3.87 | — |
| Inventive 1 | 8.6 | 27 | 80 | 64 | 43.87 | 42.73 | 1.14 | 70.5 |
| Control 2 | 0 | — | 80 | — | 46.65 | 43.35 | 3.3 | — |
| Inventive 2 | 12.9 | 27 | 80 | 56 | 43.95 | 44.42 | 0.47 | 85.7 |

†Measured after 10 days in cooler (temperature at 35-40° F.).
‡Measured within a few minutes of adding chilled brine.
*Measured at a depth of 12 inches.

While the invention has been particularly described with specific reference to particular process and product embodiments, it will be appreciated that various alterations, modifications, and adaptions may be based on the present disclosure, and are intended to be within the spirit and scope of the present invention as defined by the following claims.

What is claimed is:

1. A process for making a block of cheese having reduced moisture variability, comprising providing a bulk container having a bottom, an opposite open end and sidewalls defining a container cavity, and a tube having a fill end and an opposite discharge end; positioning the discharge end of the tube through the open end of the container at an approximately central axial location of the container; introducing cheese curd into the container cavity via the container open end, and the tube via its fill end; introducing chilled brine into the tube via its fill end to mix with curd therein; removing the tube from the cheese curd in the container; pressing the cheese curd into a cheese block; cooling the cheese block; and curing the cooled cheese block, providing a cheese block having reduced moisture content variation between a geometric center and side edges thereof.

2. The process of claim 1, wherein the positioning of the tube in the container comprises positioning the discharge end to rest on the bottom of the container.

3. The process of claim 1, wherein the removing of the tube comprises raising the tube, approximately vertically, out of the container.

4. The process of claim 1, wherein the provided cheese block has a substantially symmetrical cross-sectional shape selected from the group consisting of square, rectangular, triangular, and circular.

5. The process of claim 1, wherein the provided container has a substantially symmetrical cross-sectional shape selected from the group consisting of square, rectangular, triangular, and circular.

6. The process of claim 1, wherein the cheese curd has a salt content, and the introducing of the brine solution comprises filling a salt solution at about 25 to about 30° F. into the tube, wherein the salt solution has a salt content which is approximately the same as the salt content in the moisture phase of the cheese curd.

7. The process of claim 1, wherein the introducing of the brine solution comprises filling about 4 to about 6 percent salt solution at about 25 to about 30° F. into the tube.

8. The process of claim 7, wherein the introducing of the brine solution comprises adding about 10 to about 25 pounds of the brine solution per 640 pounds of cheese curd.

9. The process of claim 7, wherein the introducing of the brine solution comprises adding about 11 to about 15 pounds of the brine solution per 640 pounds of cheese curd.

10. The process of claim 1, wherein the provided cheese block has a diameter of about 24 to about 30 inches, and the cheese has a moisture content variation of no greater than 2.0 percent between a location at a geometric center thereof and a side edge portion.

11. The process of claim 1, wherein the tube comprises a cross-sectional diameter of about 7 inches to about 9 inches.

12. The process of claim 1, wherein the tube comprises a unitary self-supporting hollow member comprised of a wall material selected from the group consisting of polymer, metal, ceramic, and wood.

13. The process of claim 1, wherein the provided cheese is selected from the group consisting of cheddar and Colby.

14. A process for making a block of cheese having reduced moisture variability, comprising:
(A) providing a bulk container having a bottom, an opposite open end and sidewalls defining a container cavity, and a tube having a fill end, an opposite discharge end, and a diameter of about 7 to about 9 inches;
(B) positioning the discharge end of the tube through the open end of the container at an approximately central axial location of the container wherein the discharge end of the tube rests on the bottom;
(C) introducing cheese curd at a temperature of 85 to 90° F. having a NaCl content into the container cavity via the container open end and the tube via its fill end;
(D) introducing chilled brine into the tube via its fill end to mix with curd therein, wherein the brine solution comprises an aqueous NaCl solution at about 25 to about 30° F., wherein the aqueous NaCl solution has a NaCl content which is approximately the same as the NaCl content in the moisture phase of the cheese curd;
(E) removing the tube from the cheese curd in the container;
(F) pressing the cheese curd into a cheese block having a diameter of about 24 to about 30 inches;
(G) cooling the cheese block to a temperature of 32 to 40° F.; and
(H) curing the cheese block, providing a cured cheese block having a moisture content varying by no more than 2.0 percent between a location at a geometric center and a side edge portion thereof.

15. The process of claim 14, wherein the positioning of the tube in the container comprises positioning the discharge end to rest on the bottom of the container.

16. The process of claim 14, comprising providing a cured cheese block having a moisture content varying by no more than 1.0 percent between a location at a geometric center and a side edge portion thereof.

17. The process of claim 14, comprising providing a cured cheese block having a moisture content varying by no more than 0.5 percent between a location at a geometric center and a side edge portion thereof.

18. The process of claim 14, wherein the provided cheese block has a substantially symmetrical cross-sectional shape selected from the group consisting of square, rectangular, triangular, and circular.

19. The process of claim 14, wherein the introducing of the brine solution comprises filling about 4.5 to about 5.5 percent salt solution at about 25 to about 27° F. into the tube.

20. The process of claim 14, wherein the provided cheese is selected from the group consisting of cheddar and Colby.

21. The process of claim 1, wherein the introducing of the cheese curd is controlled such that the container cavity and the tube are filled with curd to a similar height.

22. The process of claim 14, wherein the introducing of the cheese curd is controlled such that the container cavity and the tube are filled with curd to a similar height.

* * * * *